(12) United States Patent
Fukano (10) Patent No.: US 8,393,741 B2
(45) Date of Patent: Mar. 12, 2013

(54) LIGHT SOURCE SYSTEM AND PROJECTOR

(75) Inventor: Kazuyasu Fukano, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 162 days.

(21) Appl. No.: 13/075,321

(22) Filed: Mar. 30, 2011

(65) Prior Publication Data

US 2011/0242497 A1 Oct. 6, 2011

(30) Foreign Application Priority Data

Mar. 31, 2010 (JP) .................................. 2010-082637

(51) Int. Cl.
*G03B 21/00* (2006.01)
*G03B 21/14* (2006.01)
*G03B 21/20* (2006.01)
*G03B 21/26* (2006.01)
*G02B 5/22* (2006.01)
*H05B 37/02* (2006.01)
*H05B 39/04* (2006.01)
*H05B 41/36* (2006.01)

(52) U.S. Cl. ................ 353/85; 353/31; 353/84; 353/94; 359/889; 315/360

(58) Field of Classification Search .............. 353/30–31, 353/84–85, 94, 121–122; 359/885, 889, 359/891–892; 315/360
See application file for complete search history.

(56) References Cited

U.S. PATENT DOCUMENTS

| | | | | |
|---|---|---|---|---|
| 6,252,636 | B1 * | 6/2001 | Bartlett | 348/743 |
| 6,874,893 | B2 * | 4/2005 | Park | 353/84 |
| 7,357,513 | B2 * | 4/2008 | Watson et al. | 353/31 |
| 8,002,413 | B2 * | 8/2011 | Narikawa | 353/37 |
| 8,052,279 | B2 * | 11/2011 | Wang et al. | 353/31 |
| 8,157,398 | B2 * | 4/2012 | Yamamoto | 362/84 |
| 8,167,440 | B2 * | 5/2012 | Sato et al. | 353/99 |
| 8,231,227 | B2 * | 7/2012 | Kurosaki | 353/31 |
| 2004/0225222 | A1 * | 11/2004 | Zeng et al. | 600/476 |
| 2006/0244929 | A1 * | 11/2006 | Sawai et al. | 353/84 |
| 2006/0268231 | A1 * | 11/2006 | Gil et al. | 351/221 |
| 2009/0034284 | A1 * | 2/2009 | Li et al. | 362/554 |

(Continued)

FOREIGN PATENT DOCUMENTS

| JP | 11-194313 A | 7/1999 |
|---|---|---|
| JP | 2003-263902 A | 9/2003 |

(Continued)

*Primary Examiner* — Tony Ko
*Assistant Examiner* — Jori S Reilly-Diakun
(74) *Attorney, Agent, or Firm* — Holtz, Holtz, Goodman & Chick, PC (57) ABSTRACT

There are provided a light source system which can suppress the deterioration of a luminescent material and a projector which can project a clear image. The light source system comprises a luminescent wheel, a driving unit for rotating the luminescent wheel, a light source for shining excitation light on to a luminescent material layer of the luminescent wheel, a light shining control unit for controlling an illumination timing of the light source, a light shining time integrating unit for integrating individual excitation light shining times to a plurality of predetermined divided areas of the luminescent wheel, an integrated light shining time storage unit for storing the individual light shining times to the predetermined divided areas, and a light shining range control unit for equalizing times over which excitation light is shone on to the plurality of predetermined divided areas of the luminescent wheel based on the individual excitation light shining times to the predetermined divided areas.

9 Claims, 7 Drawing Sheets

U.S. PATENT DOCUMENTS

| | | | |
|---|---|---|---|
| 2009/0262308 A1* | 10/2009 | Ogawa | 353/31 |
| 2009/0284148 A1* | 11/2009 | Iwanaga | 313/506 |
| 2010/0149496 A1* | 6/2010 | Inoue | 353/98 |
| 2010/0245777 A1* | 9/2010 | Ogura | 353/38 |
| 2010/0328554 A1* | 12/2010 | Shibasaki | 348/760 |
| 2010/0328617 A1* | 12/2010 | Masuda | 353/31 |
| 2010/0328625 A1* | 12/2010 | Miyazaki et al. | 353/85 |
| 2010/0328627 A1* | 12/2010 | Miyazaki | 353/85 |
| 2010/0328628 A1* | 12/2010 | Masuda | 353/85 |
| 2010/0328632 A1* | 12/2010 | Kurosaki et al. | 353/98 |
| 2011/0043765 A1* | 2/2011 | Shibasaki | 353/31 |
| 2011/0051102 A1* | 3/2011 | Ogura et al. | 353/85 |
| 2011/0063581 A1* | 3/2011 | Iwanaga | 353/31 |
| 2011/0075103 A1* | 3/2011 | Ogawa et al. | 353/31 |
| 2011/0075106 A1* | 3/2011 | Shibasaki | 353/31 |
| 2011/0096296 A1* | 4/2011 | Ogawa | 353/31 |
| 2011/0096297 A1* | 4/2011 | Ogino et al. | 353/31 |
| 2011/0096300 A1* | 4/2011 | Shibasaki | 353/85 |
| 2011/0234998 A1* | 9/2011 | Kurosaki | 353/85 |
| 2011/0242497 A1* | 10/2011 | Fukano | 353/31 |
| 2011/0242502 A1* | 10/2011 | Shibasaki | 353/84 |
| 2011/0304831 A1* | 12/2011 | Yoshigai | 353/85 |
| 2011/0317131 A1* | 12/2011 | Miyazaki | 353/31 |
| 2012/0026472 A1* | 2/2012 | Masuda | 353/85 |
| 2012/0075591 A1* | 3/2012 | Ogura et al. | 353/31 |
| 2012/0140185 A1* | 6/2012 | Masuda | 353/31 |
| 2012/0147331 A1* | 6/2012 | Miyazaki | 353/31 |
| 2012/0242963 A1* | 9/2012 | Ohta | 353/52 |
| 2012/0262677 A1* | 10/2012 | Ogino et al. | 353/31 |

FOREIGN PATENT DOCUMENTS

| | | |
|---|---|---|
| JP | 2006-098979 | 4/2006 |
| JP | 2007-060272 A | 3/2007 |
| JP | 2010-035922 A | 2/2010 |
| JP | 2011-180210 A | 9/2011 |

* cited by examiner

LIGHT SHINING TIME CONTROL DATA & DESIGNATED LIGHT SHINING RANGE DATA

| | EXTRA LIGHT SHINING TIME TO THE AREA A | EXTRA LIGHT SHINING TIME TO THE AREA B | EXTRA LIGHT SHINING TIME TO THE AREA C | DESIGNATED LIGHT SHINING RANGE DATA |
|---|---|---|---|---|
| (a) | 498 HOURS | 0 | 0 | A |
| (b) | 501 HOURS | 0 | 0 | B |
| (c) | 501 HOURS | 3 HOURS | 0 | B |
| (d) | 501 HOURS | 500 HOURS | 0 | C |
| (e) | 501 HOURS | 500 HOURS | 502 HOURS | A |

LIGHT SOURCE SYSTEM AND PROJECTOR

CROSS-REFERENCE TO RELATED APPLICATIONS

This application is based upon and claims the benefit of priority under 35 USC 119 of Japanese Patent Application No. 2010-82637 filed on Mar. 31, 2010, the entire disclosure of which, including the description, claims, drawings and abstract thereof, is incorporated herein by reference.

BACKGROUND OF THE INVENTION

1. Field of the Invention

The present invention relates to a light source system and a projector.

2. Description of the Related Art

In these days, data projectors are used on many occasions as image projection apparatuses which project images including images on screens of personal computers and video images, as well as images based on image data which is stored in memory cards on to a screen.

These projectors are such that light emitted from a light source is collected on to a micromirror device called a DMD (Digital Micromirror Device) or a liquid crystal plate for display of color images onto the screen.

In association with the propagation of video equipment such as personal computers and DVD players, the application of such data projectors is widened from use for presentations on business occasions to home use.

In these projectors, conventionally, the mainstream has been projectors using a high-intensity discharge lamp as a light source. However, in recent years, there have been made many developments on projectors which use, as a light source, a semiconductor light emitting element such as a laser diode.

For example, there have been proposed light source systems which include an excitation light source which emits light of blue wavelength band by a laser diode and a luminescent wheel (a rotary plate) which has a luminescent layer which absorbs light emitted from the excitation light source to convert it into visible light and which is driven to rotate by a motor, and projectors including such light source systems.

However, in the event that the luminescent wheel is used for a long period of time, there may occur a case where unevenness is caused in an area of the luminescent wheel on to which excitation light is shone due to large optical energy of excitation light. Then, in the event that unevenness is so caused, the deterioration speed of the luminescent material is increased at the portion where such unevenness is caused, resulting in a risk that color spots are generated in the luminescent material.

To cope with a problem like this, Japanese Unexamined Patent Application No. 2006-98979 discloses a projector in which the illuminating operation of a lamp is controlled in accordance with the rotational state of a luminescent wheel.

However, the projector disclosed is such that the lamp is not illuminated when the luminescent wheel is not rotated and does not take into consideration the suppression of deterioration of a luminescent material on the luminescent wheel due to a change with time based on unevenness generated in a working area of the luminescent wheel and generation of color spots in the luminescent material.

SUMMARY OF THE INVENTION

The invention has been made in view of the problem inherent in the related art and an object thereof is to provide a light source system which can suppress a partial deterioration of a luminescent material by controlling a light shining area of a luminescent wheel as required for change so that light in a clear and stable color can be emitted for a long period of time, and a projector which can project a clear image.

According to a first aspect of the invention, there is provided a light source system comprising a luminescent wheel in which a luminescent material layer is disposed circumferentially, a driving unit for rotating the luminescent wheel, a light source for shining excitation light on to the luminescent material layer, a light shining control unit for controlling an illumination timing of the light source, a light shining time integrating unit for integrating individual excitation light shining times to a plurality of predetermined divided areas of the luminescent wheel by the light source, an integrated light shining time storage unit for storing the individual light shining times to the predetermined divided areas integrated by the light shining time integrating unit, and a light shining range control unit for equalizing times over which excitation light is shone on to the plurality of predetermined divided areas of the luminescent wheel based on the individual excitation light shining times to the predetermined divided areas which are stored in the integrated light shining time storage unit.

According to a second aspect of the invention, there is provided a projector comprising the light source system according to the first aspect of the invention, a display device for producing an image by modulating light from the light source system, a light source side optical system for guiding light from the light source system to the display device, a projection side optical system for projecting an image emitted from the display device on to a screen, and a projector control unit for controlling the light source system and the display device.

According to a third aspect of the invention, there is provided a projector comprising a red light source for emitting light of red wavelength band, a blue light source for emitting light of blue wavelength band, an excitation light source for emitting excitation light, a luminescent wheel on which a luminescent material layer is disposed circumferentially which receives excitation light from the excitation light source to emit light of green wavelength band, a light guiding optical system for guiding the light of red wavelength band, the light of blue wavelength band and the light of green wavelength band to the same optical path, a driving unit for rotating the luminescent wheel, a light shining control unit for causing the light of red wavelength band, the light of blue wavelength band and the light of green wavelength band to be emitted sequentially, a light shining time integrating unit for integrating individual excitation light shining times to a plurality of predetermined divided areas of the luminescent wheel by the excitation light source, an integrated light shining time storage unit for storing the individual light shining times to the predetermined divided areas integrated by the light shining time integrating unit, and a light shining range control unit for equalizing times over which excitation light is shone on to the plurality of predetermined divided areas of the luminescent wheel based on the individual excitation light shining times to the predetermined divided areas which are stored in the integrated light shining time storage unit.

DETAILED DESCRIPTION OF THE PREFERRED EMBODIMENT

Hereinafter, an embodiment of the invention will be described in detail by reference to the accompanying drawings.

Figure 1:
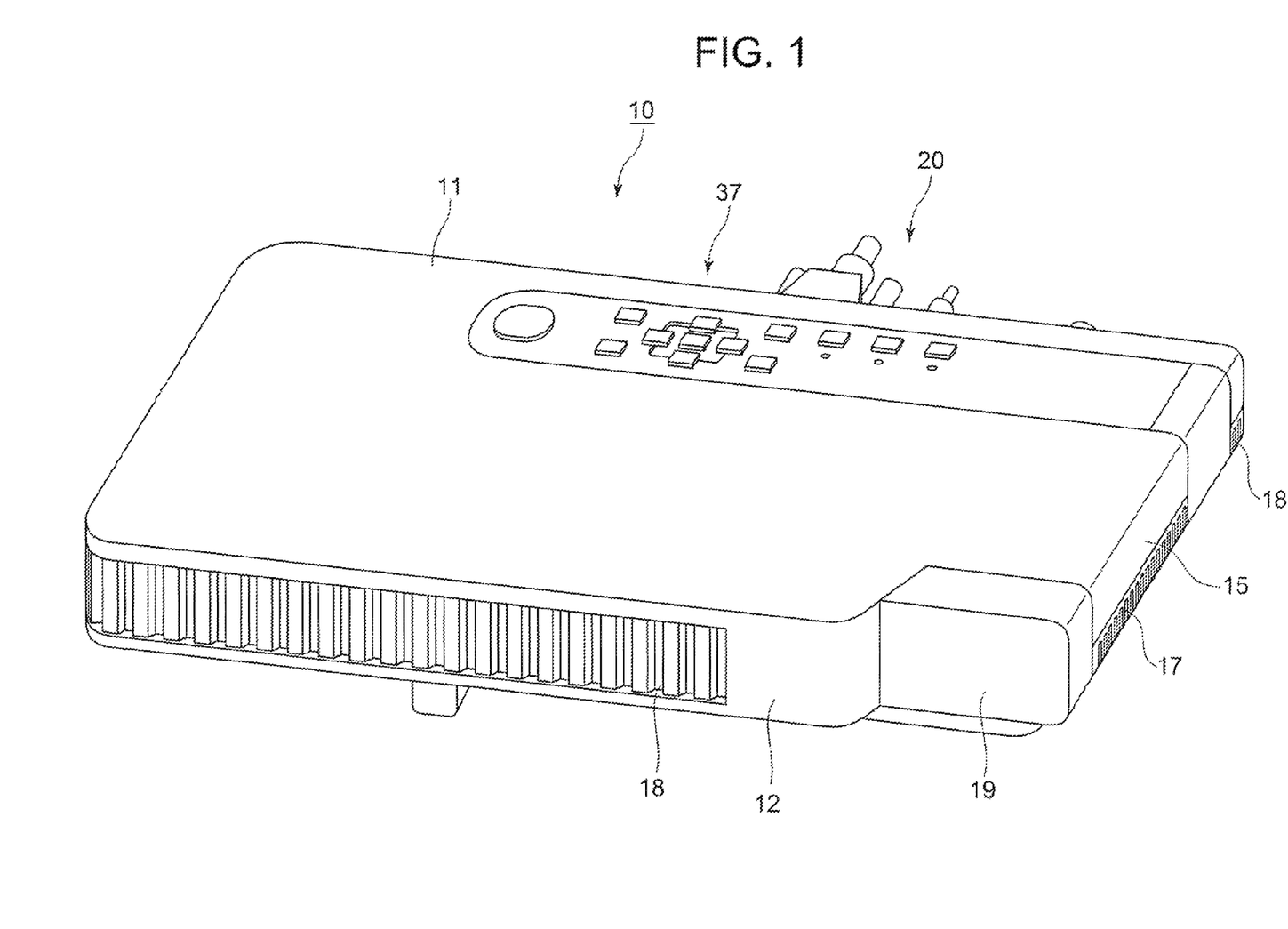
FIG. 1 is a perspective view showing an external appearance of a projector according to an embodiment of the invention.

FIG. 1 is a perspective view showing an external appearance of a projector 10. In this embodiment, when left and right are mentioned with respect to the projector 10, they denote, respectively, leftward and rightward directions with respect to an image projecting direction of the projector 10, and when front and rear are mentioned, they denote, respectively, forward and rearward directions with respect to the direction of a screen side of the projector 10 and a traveling direction of light rays.

As is shown in FIG. 1, the projector 10 has a substantially rectangular parallelepiped shape and has a lens cover 19 which covers a projection port which is laid to a side of a front panel 12 which is referred to as a front side panel of a housing of the projector, and the front panel 12 has a plurality of outside air inlet ports 18.

Further, although not shown, the projector 10 includes an Ir reception part for receiving a control signal from a remote controller.

In addition, a keys/indicators part 37 is provided on an upper side panel 11 of the housing. Disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the housing are an input/output connectors part where USB terminals, an image signal input D-SUB terminal, an S terminal, an RCA terminal and the like are provided and various types of terminals 20 including a power supply adaptor plug.

A plurality of outside air inlet ports are formed in the back side panel. A plurality of inside air outlet ports 17 are formed in each of a right-hand side panel 14, which is a lateral side panel of the housing and is not shown, and a left-hand side panel 15, which is a lateral side panel shown in FIG. 1.

In addition, outside air inlet ports 18 are also formed in a corner portion of the left-hand side panel 15 which lies in proximity to the back side panel.

Further, a plurality of outside air inlet ports or a plurality of inside air outlet ports are formed in a bottom panel, which is not shown, in each of positions lying in proximity to the front side panel, the back side panel, the left-hand side panel and the right-hand side panel.

Next, an internal construction of the projector 10 will be described.

Figure 2:
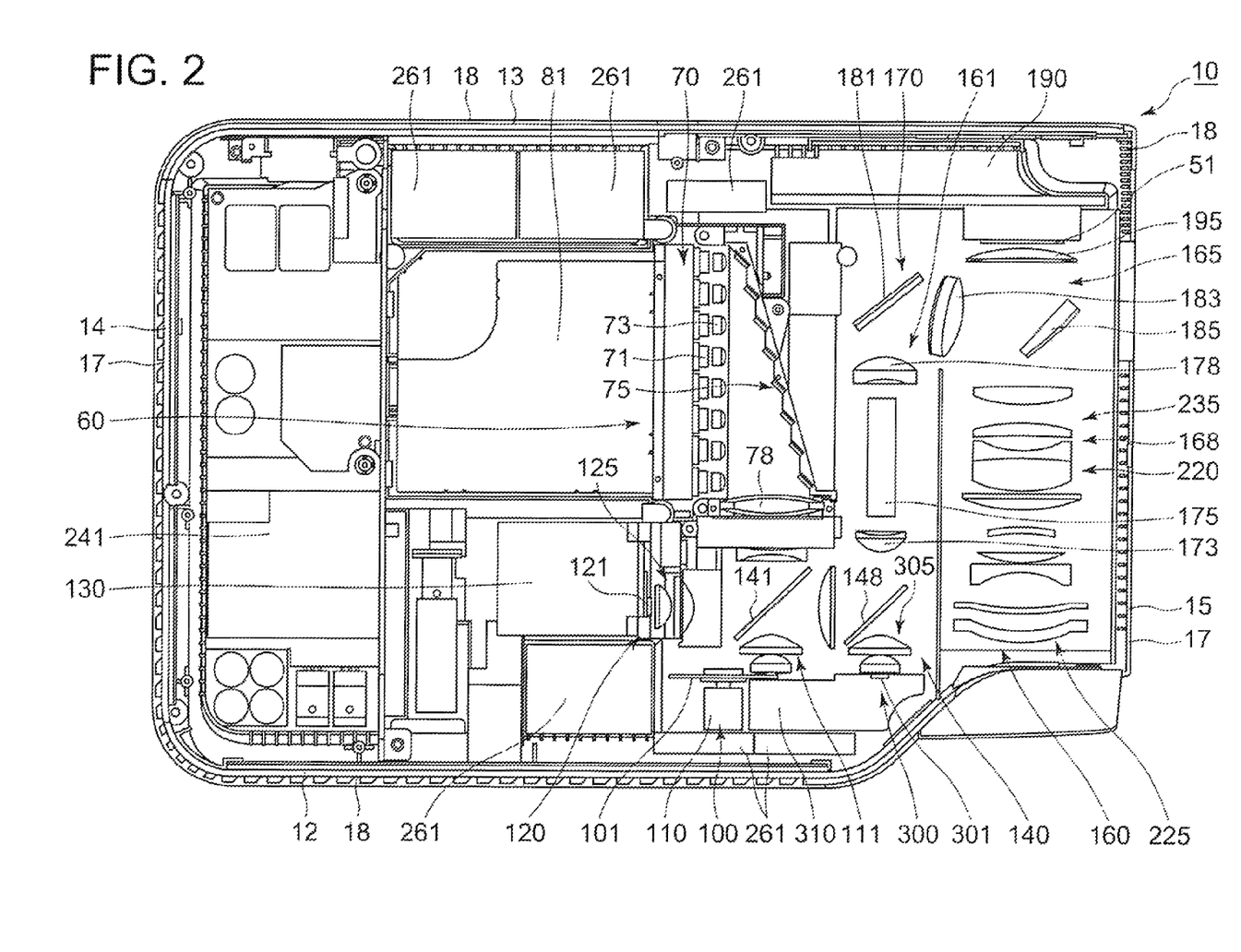
FIG. 2 is an exemplary plan view showing an internal construction of the projector according to the embodiment of the invention.

FIG. 2 is an exemplary plan view showing an internal construction of the projector 10.

As is shown in FIG. 2, the projector 10 includes a control circuit board 241 which is disposed in proximity to the right-hand side panel 14.

This control circuit board 241 includes a power supply circuit block and a light source control block.

In addition, the projector 10 includes a light source unit 60 which is provided to a side of the control circuit board 241, that is, at a substantially central portion of the housing of the projector.

Further, the projector 10 includes an optical system unit 160 which is disposed between the light source unit 60 and the left-hand side panel 15.

The light source unit 60 includes an excitation light shining device 70 which is disposed in a position lying at a substantially central portion in a left-right direction of the housing of the projector and in proximity to the back panel 13, a luminescent light emitting device 100 which is disposed in a position lying on optical axes of light rays which are emitted from the excitation light shining device 70 and in proximity to the front panel 12, a blue light source device 300 which is disposed in proximity to the front panel 12 so as to be in parallel with light rays which are emitted from the luminescent light emitting device 100, a red light source device 120 which is disposed between the excitation light shining device 70 and the luminescent light emitting device 100, and a light guiding optical system 140 which alters optical axes of light rays emitted from the luminescent light emitting device 100, optical axes of light rays emitted from the red light source device 120 and optical axes of light rays emitted from the blue light source device 300 so that the respective optical axes of the light rays converge to the same optical axis so as to collect the respective colored light rays on to an incident opening of a light tunnel 175 which constitutes a predetermined plane.

The excitation light shining device 70 includes an excitation light source 71 which is disposed so that optical axes of light rays emitted therefrom become parallel to the back panel 13, a reflecting mirror group 75 which alters the optical axes of the light lays emitted from the excitation light source 71 through 90 degrees so as to be oriented towards the front panel 12, a collective lens 78 for collecting the light rays emitted from the excitation light source 71 and reflected on the reflecting mirror group 75 and a heat sink 81 which is disposed between the excitation light source 71 and the right-hand side panel 14.

The excitation light source 71 includes a total of 24 blue laser diodes which are arranged into a matrix configuration of three rows and eight columns, and collimator lenses 73 are disposed individually on optical axes of the blue laser diodes. The collimator lenses 73 are collective lenses which convert light rays emitted from the respective blue laser diodes into parallel light rays.

In addition, the reflecting mirror group 75 includes a plurality of reflecting mirrors which are arranged in a step-like fashion so as to emit the light rays emitted from the excitation light source 71 towards the collective lens 78 while reducing sectional areas of the light rays so emitted in one direction.

A cooling fan 261 is disposed between the heat sink 81 and the back panel 13, and the excitation light source 71 is cooled by the cooling fan 261 and the heat sink 81.

Further, a cooling fan 261 is also disposed between the reflecting mirror group 75 and the back panel 13, and the reflecting mirror group 75 and the collective lens 78 are cooled by the cooling fan 261.

The luminescent light emitting device 100 includes a luminescent wheel 101 which is disposed so as to be parallel to the front panel 12, that is, so as to be at right angles to the optical axis of the light emitted from the excitation light shining device 70, a wheel motor 110 which drives the luminescent wheel 101 to rotate and a collective lens group 111 which collects light rays emitted from the luminescent wheel 101 in the direction of the back panel 13.

The luminescent wheel 101 is a circular disc-shaped metallic base.

An annular luminescent light emitting area is formed on the luminescent wheel 101 as a recess portion. This annular luminescent light emitting area receives the light emitted from the excitation light source 71 as excitation light so as to emit luminescent light of green wavelength band. The luminescent wheel 101 functions as a luminescent plate which receives excitation light to emit luminescent light.

A surface of an excitation light source 71 side of the luminescent wheel 101 which includes the luminescent light emitting area is mirror finished through silver deposition so as to form a reflecting surface thereon which reflects light. A green luminescent material layer is laid on this reflecting surface.

In addition, the luminescent wheel 101 has a rotation reference position 101a which is provided to detect a reference position of rotation, and the rotation reference position 101a is provided through application of a magnetic material or the like.

The light emitted from the excitation light shining device 70 so as to be shone on to the green luminescent material layer of the luminescent wheel 101 excites a green luminescent material in the green luminescent material layer.

Luminescent light rays which are emitted by luminescence in every direction from the green luminescent material excited are emitted directly towards the excitation light source 71 or are reflected on the reflecting surface of the luminescent wheel 101 so as to be then emitted towards the excitation light source 71.

Excitation light which is shone onto the metallic base without being absorbed by the luminescent material in the luminescent material layer is reflected on the reflecting surface so as to be incident on the luminescent material layer again to excite the luminescent material.

Consequently, by making a surface of the recess portion in the luminescent wheel 101 function as the reflecting surface, the utilization efficiency of excitation light emitted from the excitation light source 71 can be increased so that the luminescent wheel 101 can luminesce more brightly.

In the excitation light which is reflected towards the luminescent material layer side on the reflecting surface of the luminescent wheel 101, excitation light emitted towards the excitation light source 71 without being absorbed by the luminescent material passes through a primary dichroic mirror 141, which will be described later, while luminescent light is reflected by the primary dichroic mirror 141. Thus, there is no such situation that excitation light is emitted to the outside of the light source unit 60.

In addition, the cooling fan 261 is disposed between the wheel motor 110 and the front panel 12, whereby the luminescent wheel 101 is cooled by this cooling fan 261.

The red light source device 120 includes a red light source 121 which is disposed so that its optical axis becomes parallel to the excitation light source 71 and a collective lens group 125 which collects light emitted from the red light source 121.

This red light source device 120 is disposed so that its optical axis intersects the light emitted from the excitation light shining device 70 and the luminescent light of green wavelength band which is emitted from the luminescent wheel 101 at right angles.

The red light source 121 is a red light emitting diode which is a semiconductor light emitting device which emits light of red wavelength band.

The red light source device 120 includes a heat sink 130 which is disposed on a side of the red light source 121 which faces the right-hand side panel 14.

A cooling fan 261 is disposed between the heat sink 130 and the front panel 12, whereby the red light source 121 is cooled by this cooling fan 261.

The blue light source device 300 includes a blue light source 301 which is disposed so as to be parallel to the optical axis of the luminescent light emitted from the luminescent light emitting device 100 and a collective lens group 305 which collects light emitted from the blue light source 301.

This blue light source device 300 is disposed so that its optical axis intersects the light emitted from the red light source device 120 at right angles.

The blue light source 301 is a blue light emitting diode which is a semiconductor light emitting device which emits light of blue wavelength band.

The blue light source device 300 includes a heat sink 310 which is disposed on a side of the blue light source 301 which faces the front panel 12.

A cooling fan 261 is disposed between the heat sink 310 and the front panel 12, whereby the blue light source 301 is cooled by this cooling fan 261.

The light guiding optical system 140 includes a collective lens which collects light rays of red, green and blue wavelength bands and dichroic mirrors which alter optical axes of the light rays of red, green and blue wavelength bands so that the light rays converge to the same optical axis.

Specifically, the light guiding optical system 140 includes the primary dichroic mirror 141 which is disposed in a position where the optical axes of the light of blue wavelength band emitted from the excitation light shining device 70 and the light of green wavelength band emitted from the luminescent wheel 101 intersect the optical axis of the light of red wavelength band emitted from the red light source device 120 at right angles. This primary dichroic mirror 140 transmits the light of blue wavelength band and the light of red wavelength band and reflects the light of green wavelength band so as to alter the optical axis of the light of green wavelength band through 90 degrees in the direction of the left-hand side panel 15.

The light guiding optical system 140 includes a secondary dichroic mirror 148 which is disposed in a position where the optical axis of the light of blue wavelength band emitted from the blue light source device 300 and the optical axis of the light of red wavelength band emitted from the red light source device 120 intersect each other at right angles. This secondary dichroic mirror 148 transmits the light of blue wavelength band and reflects the light of green wavelength band and the light of red wavelength band so as to alter the optical axes of the light of green wavelength band and the light of red wavelength band through 90 degrees in the direction of the back panel 13.

A collective lens is disposed between the primary dichroic mirror 141 and the secondary dichroic mirror 148.

A collective lens 173 is disposed in proximity to the light tunnel 175, and this collective lens 173 collects light source light to the incident opening of the light tunnel 175.

The optical system unit 160 has a substantially U-shape and includes three blocks such as an illumination side block 161 which is positioned to a side of the excitation light shining device 70 which faces the left-hand side panel 15, an image generation block 165 which is positioned in proximity to a position where the back panel 13 and the left-hand side panel 15 meets each other, and a projection side block 168 which is positioned between the light guiding optical system 140 and the left-hand side panel 15.

The illumination side block 161 includes part of a light source side optical system 170 which guides light source light emitted from the light source unit 60 to the display device 51 which is included in the image generation block 161.

The light source side optical system 170 that is included in the illumination side block 161 includes the light tunnel 175 which converts light rays emitted from the light source unit 60 into light rays whose intensity distribution is uniform, a collective lens 178 which collets light rays emitted from the light tunnel 175, and an optical axis altering mirror 181 which alters optical axes of the light rays emitted from the light tunnel 175 in the direction of the image generation block 165.

The image generating block 165 has, as the light source side optical system 170, a collective lens 183 which collects the light source light which is reflected on the optical axis altering mirror 181 to the display device 51 and a shining mirror 185 which shines the light rays which have passed through the collective lens 183 onto the display device 51 at a predetermined angle.

The image generation block 165 includes further a DMD which is the display device 51.

A heat sink 190 is disposed between the display device 51 and the back panel 13 to cool the display device 51, and the display device 51 is cooled by this heat sink 190.

A collective lens 195, which constitutes the projection side optical system 220, is disposed in proximity to a front of the display device 51.

The projection side block 168 has a lens group of the projection side optical system 220 which projects on-light reflected by the display device 51 on to the screen.

The projection side optical system 220 includes a fixed lens group 225 which is incorporated in a fixed lens barrel and a movable lens group 235 which is incorporated in a movable lens barrel.

These lens groups are configured as a variable focus lens having a zooming function, and zooming and focusing operations are enabled by moving the movable lens group 235 by a lens motor.

Next, a projector control unit of the projector 10 will be described by use of a block diagram in FIG. 3.

The projector control unit includes a control part 38, an input/output interface 22, an image transforming part 23, a display encoder 24, a display drive part 26 and the like.

The control part 38 governs the control of respective operations of circuitries within the projector 10 and is made up of a CPU, a ROM which stores in a fixed fashion operation programs such as various types of settings and a RAM which is used as a work memory and the like.

The projector control unit controls so that image signals of various standards that are inputted from the input/output connector part 21 are sent via the input/output interface 22 and a system bus (SB) to the image transforming part 23 where the image signals are transformed so as to be unified into an image signal of a predetermined format which is suitable for display. Thereafter, the image signals so transformed are outputted to the display encoder 24.

In addition, the display encoder 24 deploys the image signals entered thereinto on a video RAM 25 for storage therein and generates a video signal from the contents stored in the video RAM 25, outputting the video signal so generated to the display drive part 26.

The display drive part 26 functions as a display device controller and drives the display device 51, which is a spatial optical modulator (SOM), at an appropriate frame rate in accordance with the image signal outputted from the display encoder 24.

Light rays which are emitted from the light source unit 60 are shone onto the display device 51 via the light source side optical system to thereby form an optical image by reflected light reflected at the display device 51. The image so formed can be projected on to a screen, not shown, for display via the projection side optical system, which will be described later.

The movable lens group 235 of the projection side optical system is driven by the lens motor 45 for adjustment such as zooming or focusing.

In addition, an image compression/expansion part 31 performs a recording operation in which a luminance signal and a color difference signal of an image signal are data compressed through operations such as ADCT and Huffman effect and the compressed data is sequentially written on a memory card 32 which is configured as a detachable recording medium.

The image compression/expansion part 31 further performs an operation in which when in a reproducing mode, the image compression/expansion part 31 reads out image data recorded on the memory card 32 and expands individual image data which make up a series of dynamic images frame by frame. Then, the image data is outputted to the display encoder 24 via the image transforming part 23 so as to enable the display of dynamic images on the basis of the image data stored on the memory card 32.

Operation signals generated at the keys/indicators part 37 which is made up of the main keys and indicators provided on the upper side panel 11 of the housing are sent out directly to the control part 38.

Key operation signals generated by operating keys on the remote controller are received by the Ir reception part 35, and a code signal demodulated at an Ir processing part 36 is outputted to the control part 38.

In addition, a voice processing part 47 is connected to the control part 38 via the system bus (SB).

This voice processing part 47 includes a sound source circuit such as a PCM sound source. When in a projection mode and a reproducing mode, the voice processing part 47 converts voice data into analog signals and drives a speaker 48 to output loudly sound or voice based on the voice data.

Additionally, the control part 38 controls a light source control circuit 41. This light source control circuit 41 controls individually the emission of light by the excitation light shining device, the red light source device and the blue light source device of the light source unit 60 so that light of a predetermined wavelength band which is required at the time of generating an image is emitted from the light source unit 60.

Further, the control part 38 causes a cooling fan drive control circuit 43 to detect temperatures through a plurality of sensors which are provided at the light source unit 60 so as to control the rotating speed of a cooling fan based on the results of the temperature detection.

In addition, the control part 38 also causes the cooling fan drive control circuit 43 to make the cooling fan continue to rotate even after the power supply of a projector main body is switched off by use of a timer or the like or to make the power supply to the projector main body be cut off depending upon the results of the temperature detection by the temperature sensors.

Figure 4:
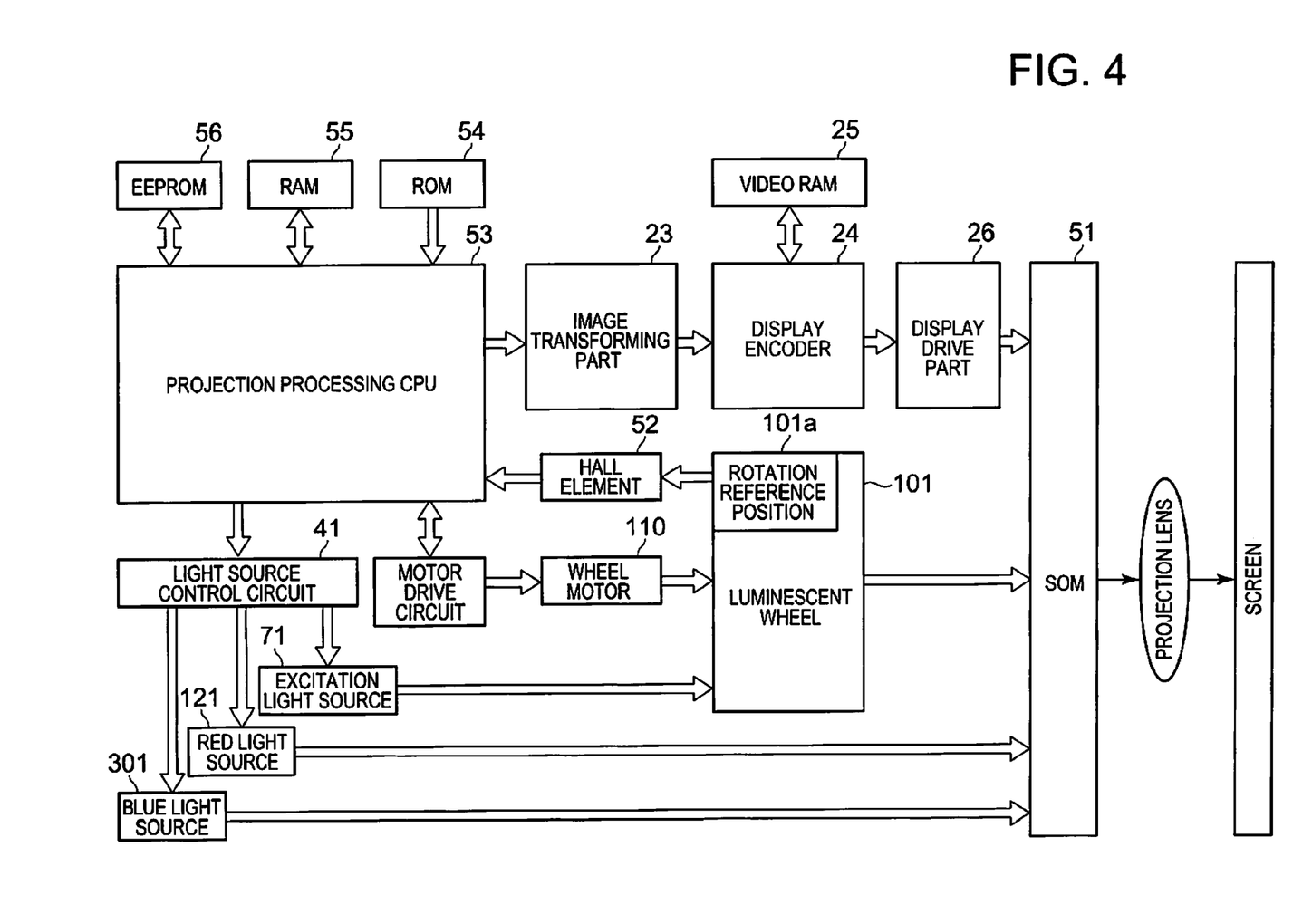
FIG. 4 is a schematic circuit block diagram involved in a projection processing of the projector according to the embodiment of the invention.

Next, a circuit block will be described by reference to FIG. 4 which is involved in controlling a projection system for controlling a light shining range of the luminescent wheel 101 in the invention.

Figure 3:
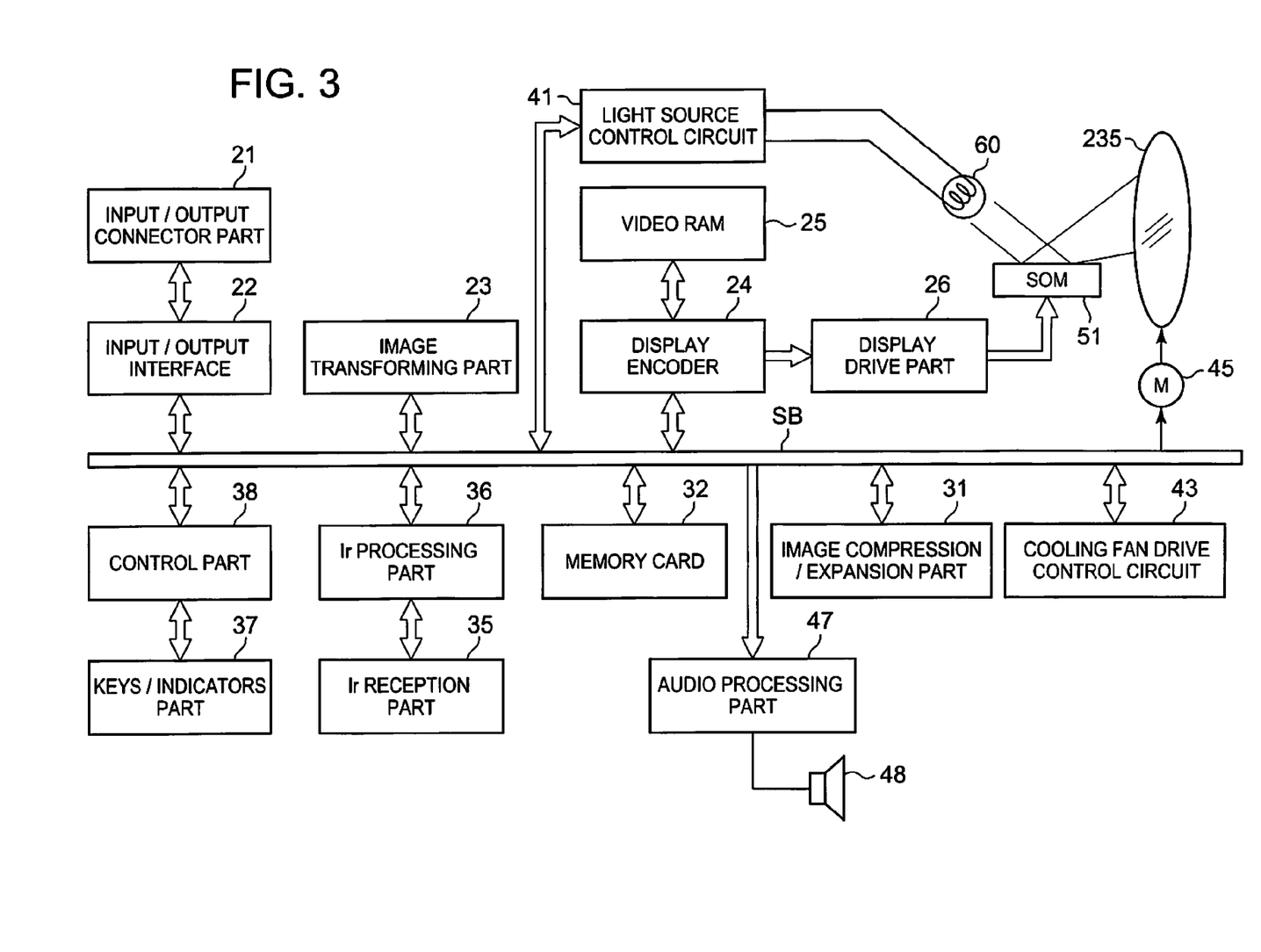
FIG. 3 is a functional block diagram of the projector according to the embodiment of the invention.

The control part 38 described in the function block diagram shown in FIG. 3 includes a projection processing CPU 53 which is a CPU for performing a projection processing.

A memory part including a ROM 54, a Ram 55, an EEPROM 56 is connected to the projection processing CPU 53.

In addition, the image transforming part 23 is connected to the projection processing CPU 53, and as has been described before, the image transforming part 23 drives the display device 51 which is the spatial optical modulator (SOM) via the display encoder 24, the video RAM 25 and the display drive part 26.

Further, the projection processing CPU 53 controls the blue light source 301, the red light source 121 and the excitation light source 71 for generating green light via the light source control circuit 41. The projection processing CPU 53 time sharing controls individually these light sources so as to emit light.

A motor drive circuit for driving the wheel motor 110 is connected to the projection processing CPU 53. The projection processing CPU 53 also doubles as a light shining control unit for causing the wheel motor 110 which is integrated with the luminescent wheel 101 to rotate at a constant speed and causing light rays generated by the excitation light source 71 to be shone on to the luminescent wheel 101 so as to generate green light.

The projection processing CPU 53 causes the luminescent wheel 101 to rotate at higher speeds so as to prevent the concentration of energy to a portion of the luminescent wheel.

For example, in the event that the emission times of red, blue and green light are controlled to be equal while causing the luminescent wheel 101 to make four or five rotations per one frame rate (for example, 50 Hz), the laser beam is understood to be shone on to the luminescent wheel 101 for a time length equal to four-thirds or five-thirds rotations of the luminescent wheel 101 during one frame.

As this occurs, the laser beam is shone twice on to a specific area on the luminescent wheel 101 during one frame, while the laser beam is shone once on to the other areas.

Namely, in the event that the projection processing CPU 53 causes the luminescent wheel 101 to rotate a constant speed and controls the shining timing of the laser beam to stay uniform, at a specific area on the luminescent wheel 101, the laser beam or light shining time becomes double those of the other areas.

Then, the projection processing CPU 53 functions as a light shining range control unit, and when an integrated time stored in an integrated time storage unit, which is the RAM 55, exceeds a predetermined value, the projection processing CPU 53 functions as a light shining control unit and changes an illumination starting point of the excitation light source 71 by controlling a delay amount from a point in time when the rotation reference position 101a is detected by a Hall element 52, which is a rotating position detection unit.

In this way, the projection processing CPU 53 controls the position on the luminescent material layer on to which the excitation light is shone twice during one frame so as to change the position.

The rotating position detection unit may detect the rotation reference position disposed on the luminescent wheel 101 by use of any other optical element than the Hall element 52 such as a reflection type photoreflector.

The projection processing CPU 53 also doubles as a light shining time integrating unit for integrating a light shining time to the light shining range on the luminescent material layer of the luminescent wheel 101 on to which excitation light is shone twice during one frame.

In the event that the times integrated by the light shining time integrating unit exceeds a threshold stored in the ROM 54, the projection processing CPU 53 functions as a light shining range control unit for changing the light shining range on the luminescent material layer on the luminescent wheel 101 on to which excitation light is shone twice during one frame.

Functioning as the light shining time integrating unit, the projection processing CPU 53 integrates individually light shining times to a plurality of divided light shining ranges on the luminescent wheel 101.

Namely, the projection processing CPU 53 causes the wheel motor 110, which is the driving unit, to drive to rotate the luminescent wheel 101 at a constant speed, detects the rotation reference position 101a of the luminescent wheel 101 which is rotating and delays the illumination of the excitation light source 71 for a predetermined period of time which takes the rotating speed of the luminescent wheel 101 into consideration from a timing at which the rotation reference position 101a is detected.

The projector 10 has, for example, a low luminance mode in which a good color balance takes precedence over other factors as in viewing movies or the like and a high luminance mode in which brightness takes precedence over other factors as when used for presentation of information at a meeting.

The projector 10 may change the light intensity of the excitation light source 71 in accordance with these modes (luminance).

Consequently, when functioning as the light shining time integrating unit, the projection processing CPU 53 performs integration by multiplying light shining time by light intensity factor in accordance with the intensity of excitation light.

The luminescent wheel 101 has the rotation reference position 101a where a magnetic material is coated. The Hall element 52 is connected to the projection processing CPU 53, and the Hall element 52 functions as the rotating position detection unit to detect the rotation reference position 101a.

Storing projection processing programs therein, the ROM 54 also functions as a storage medium in which programs are stored which can be read by the projection processing CPU 53.

The ROM 54 also functions as a threshold storage memory which stores in advance a threshold of the light shining time to the light shining range on the luminescent wheel 101.

Provided in the RAM 55 a work area for controlling the light shining times to the plurality of divided light shining ranges on the luminescent wheel 101, the RAM 55 is the integrated light shining time storage unit in which data which indicates the light shining range on the luminescent wheel 101 on to which excitation light is to be shone are stored, so as to equalize the light shining times to the light shining ranges on the luminescent material layer on to which excitation light is shone twice during one frame.

The EEPROM 56 is a backup memory which captures and retains data indicating the respective light shining times of the light shining ranges which are stored in the work area of the RAM 55 when the power supply of the projector 10 was switched off and the light shining range of the luminescent wheel 101 on to which excitation light is to be shone next time the projector 10 is activated.

Next, described by use of the drawings will be an example of division of the whole light shining range of the luminescent wheel 101 into equal light shining ranges, data on respective light shining times of the light shining ranges which is retained in the EEPROM 56 and data indicating a light shining range on to which excitation light is to be shone next time the projector 10 is activated based on the former data.

Figure 5:
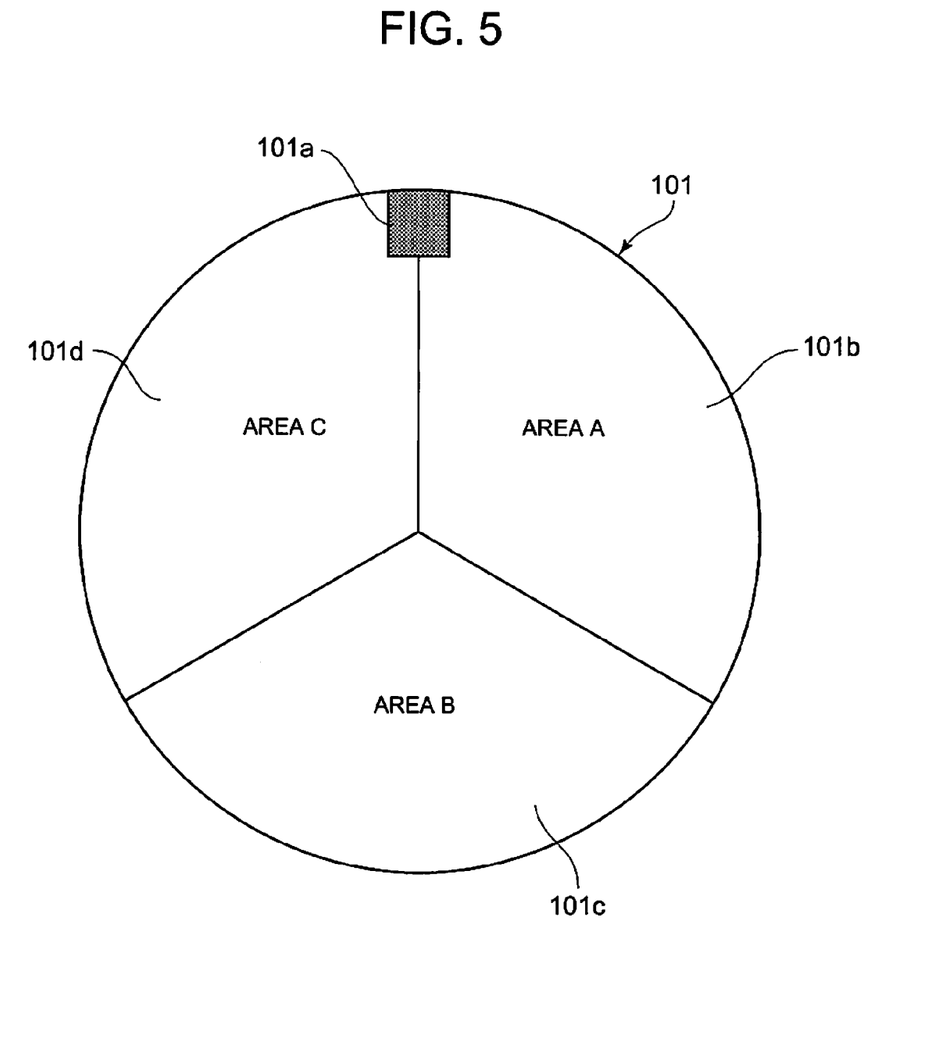
FIG. 5 is an explanatory diagram showing an example of an idea for dividing a light shining range of a luminescent wheel of the projector according to the embodiment of the invention.
Figure 6:
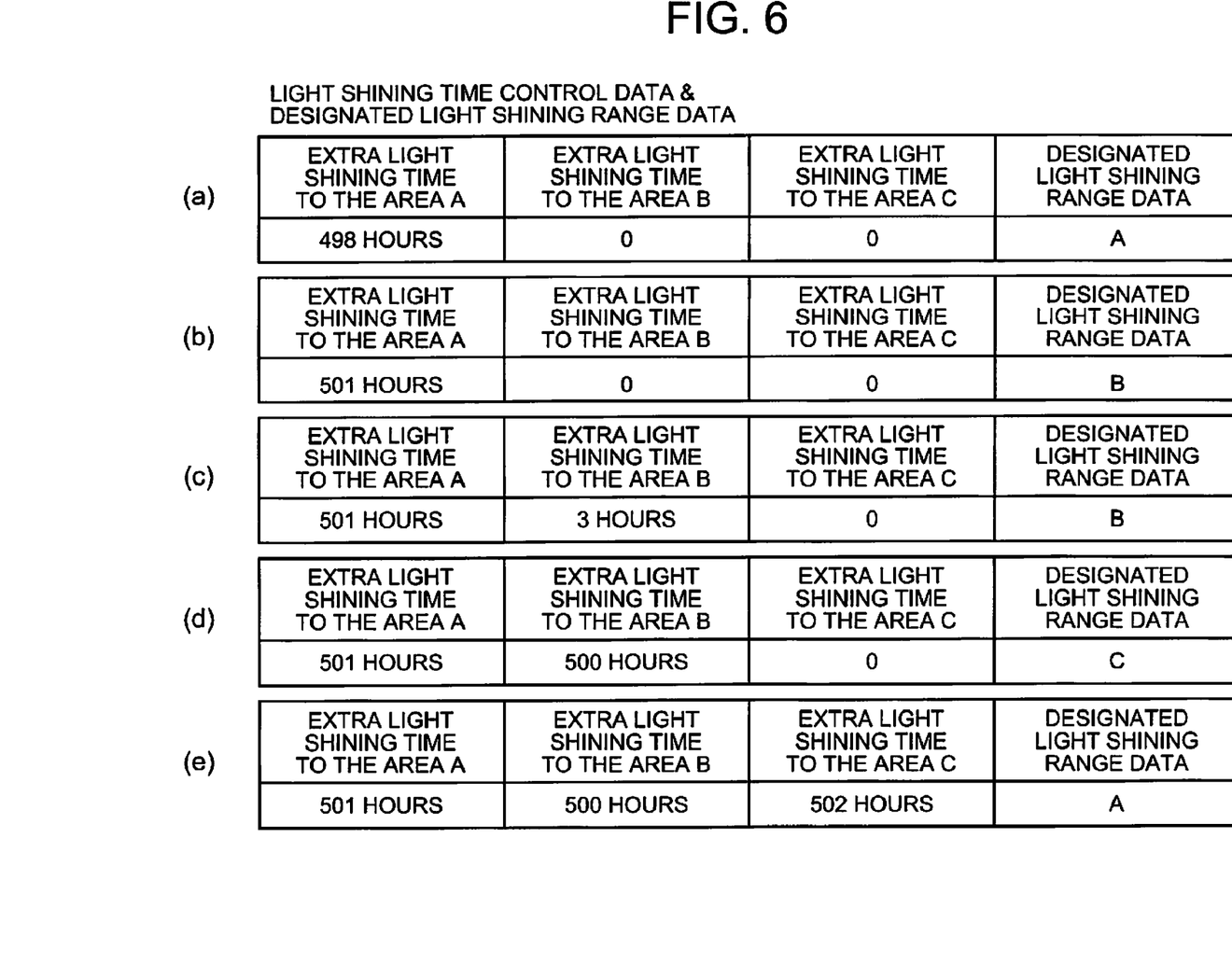
FIGS. 6A to 6E show explanatory tables in relation to light shining time control data and light shining range data of the luminescent wheel according to the embodiment of the invention.

FIG. 5 is an explanatory diagram showing an example of division of the whole light shining range of the luminescent wheel into a plurality of light shining ranges, and FIG. 6 shows explanatory tables in relation to light shining time control data and light shining range data based on the proposed division of the whole light shining range of the luminescent wheel shown in FIG. 5.

As is shown in FIG. 5, the luminescent wheel 101 has the rotation reference position 10a which is provided by being coated with a magnetic material.

As has been described before, the luminescent wheel 101 is caused to rotate at a constant speed by the wheel motor 110 which is integrated by the projection processing CPU 53.

The projection processing CPU 53 can cause the excitation light source 71 to shine excitation light on to the luminescent wheel 101 from a predetermined position thereon as a starting position by illuminating the excitation light source 71 at a timing at which the rotation reference position 101a is detected by the Hall element 52 or at a timing of delaying for a predetermined time length from the rotation reference position detection timing.

As is shown in FIG. 5, three divided light shining areas such as an area A 101b, an area B 101c and an area C 101d are set on the luminescent wheel 101 as light shining ranges on to which excitation light is shone by the excitation light source 71, whereby the projection processing CPU 53 can control respective integrated light shining times on the divided light shining areas as required.

Light shining time control data for the individual light shining ranges of the luminescent wheel 101 and designated light shining range data shown in FIG. 6 are retained in the EEPROM 56 which is the memory described before.

These data are such as to be retained when the power supply of the projector 10 is switched off, and data are retained which each indicate a light shining time of a specific light shining range or area on to which excitation light has been shone more than the other areas, which will be described later, and a designated light shining range which is set based on a threshold time (for example, 500 hours) which is set in advance on the ROM 54.

In FIG. 6, for example, the three divided light shining ranges such as the area A 101b, the area B 101c and the area C 101d are set as the light shining ranges on to which excitation light is shone by the excitation light source 71, and it is considered as a rotating speed of the luminescent wheel 101 that the luminescent wheel 101 rotates four times or four full rotations within one frame.

Namely, the laser beam is understood to be shone on to the luminescent wheel 101 for a time length equal to four-thirds rotations of the luminescent wheel 101 during one frame. In the event that the luminescent wheel 101 having the area A 101b, the area B 101c and the area C 101d as is shown in FIG. 5, is caused to rotate counterclockwise as viewed from the excitation light source 71 side and the excitation light is started to be shone on to the luminescent wheel 101 from the rotation reference position 101a as a rotation start reference position, the laser beam is understood to be shone twice on to the area A 101b during one frame every time.

Then, the light shining time at the area A 101b on the luminescent wheel 101 is understood to include extra light shining time more than the other areas due to the laser beam being shone twice on to the area A 101b during one frame. Let's assume that this light shining time of the area A 101b is integrated to reach 498 hours. When the power supply of the projector 10 is switched off, as is shown in FIG. 6A, data is retained in the EEPROM 56 which indicates that the light shining time to the area A 101b is 498 hours.

Then, data indicating the light shining range on to which excitation light is to be shone next time the projector 10 is activated becomes data which indicates "A" as the light shining range on to which excitation light is to be shone next time since the light shining time to the area A 101b is less than the threshold time which is 500 hours.

Then, in the event that the projector 10 is activated in the state illustrated in FIG. 6A and the excitation light continues to be shone on to the luminescent wheel 101 for 36 hours, the emission time of light of green wavelength band by the luminescent wheel 101 is 12 hours. As is shown in FIG. 6B, the light shining time to the area A 101b becomes three hours longer than those to the other areas, which means that excitation light is shone on to the area A 101b three hours longer than to the other areas. Thus, the extra light shining time to the area A 101b becomes 501 hours.

In this way, when the projector 10 is stopped to operate in such a state that the extra light shining time to the area A 101b which is longer than those to the other areas exceeds 500 hours, since the extra light shining time exceeds the threshold time of 500 hours, data indicating the light shining range on to which excitation light is to be shone next time the projector 10 is activated becomes data which indicates "B" as the light shining range on to which excitation light is to be shone next time.

Namely, the projection processing CPU 53 delays the start of shining of the laser beam for a time length equal to one third rotation of the luminescent wheel 101 after the detection of the rotation reference position 101a.

Hereinafter, similarly, as is shown in FIGS. 6C to 6E, every time the integrated light shining time of the specific area on to which excitation light or laser beam is shone longer than the other areas exceeds the threshold time, the designated light shining range data which is data indicating the light shining range on to which excitation light is to be shone next time the projector 10 is activated is changed to designate the next area.

Then, as is shown in FIG. 6E, in the event that the power supply is switched off with the light shining time to the area C 101d exceeding 500 hours, the threshold time is changed from 500 hours to 1000 hours, and data indicating the light shining range on to which excitation light is to be shone next time the projector 10 is activated becomes data which indicates "A" as the light shining range on to which excitation light is to be shone next time or indicates that the light shining range has returned to the area A 101b again.

Figure 7:
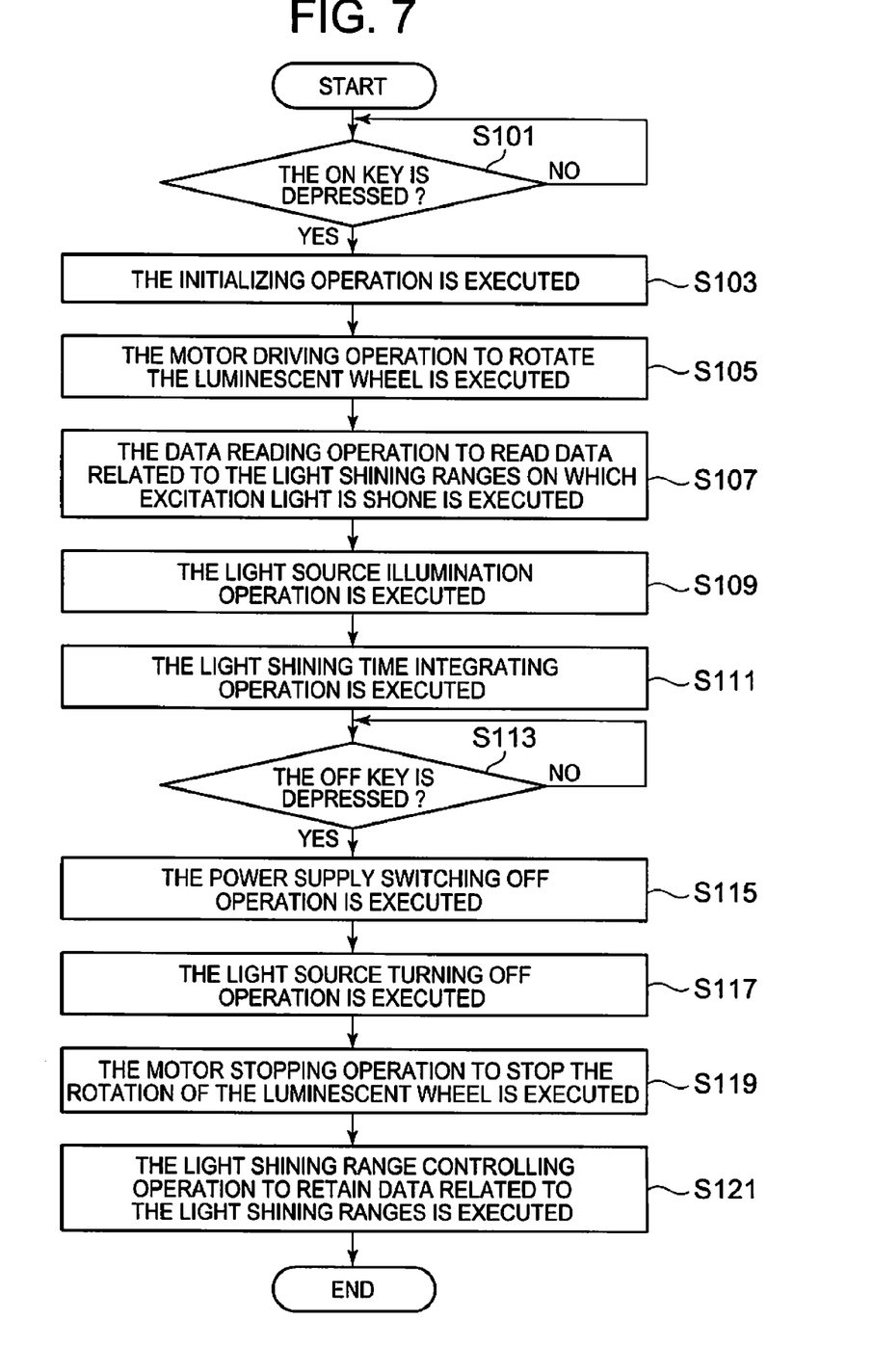
FIG. 7 is a flowchart showing a flow of control of the light shining range of the luminescent wheel of the projector according to the embodiment of the invention.

Next, the flows of a control of the light shining time to each light shining range on the luminescent wheel 101 and an operation to set the light shining range will be described by use of a flowchart shown in FIG. 7.

The projector 10 executes a system activating operation (Yes in step S101) by the power supply switch key (the ON key) being depressed by the user.

The projector 10 executes an initializing operation of each unit or part as the system activating operation (Yes in step S101).

Specifically, the projection processing CPU 53 executes an establishing operation of a communication protocol with the various ICs which are connected thereto and an initializing operation (step S103) of such devices as the DMD, which is the display device 51, and the wheel motor 110.

Confirming that the system is normal through the initializing operation (step S103), the projection processing CPU 53 executes a motor driving operation (step S105) to drive the wheel motor 110 by controlling the motor driving circuit so as to rotate the luminescent wheel 101.

Next, the projection processing CPU 53 executes a data reading operation (step S107) to read data stored in the EEPROM 56 and indicating the light shining times of the light shining ranges and the light shining ranges on the luminescent wheel 101 on to which excitation light is shone and deploys the data on to the work area of the RAM 55.

The projection processing CPU 53 reads the data indicating the light shining range of the luminescent wheel 101 through the data reading operation (step S107) and determines the light shining range on to which excitation light is to be shone.

Next, the projection processing CPU 53 sets respective light emitting timings of the light sources so that the light sources are time sharing illuminated.

Here, the projection processing CPU 53 executes a rotation reference position detecting operation to detect the rotation reference position 101a of the luminescent wheel 101 by the Hall element 52 so that excitation light rays of the excitation light source are shone on to the light shining range of the luminescent wheel 101 which has been set before.

Then, the projection processing CPU 53 executes a light source illuminating operation (step S109) while executing a light shining range controlling operation to change the light shining range on the luminescent material layer on to which excitation light is shone twice during one frame by delaying the emission of excitation light for a predetermined time length from the excitation light source 71 by the light shining control unit.

The projection processing CPU 53 executes a light shining time integrating operation (step S111) to start the integration of the light shining time to the designated light shining range on the luminescent material layer on the luminescent wheel 101 on to which excitation light is shone twice by the luminescent light source 71 during one frame so that the respective light shining times of the light shining ranges which are deployed on the work area of the RAM 55 can be updated at the same time as the individual light sources can be time sharing illuminated to emit light.

The projector 10 in operation executes a power supply switching off operation by the power supply switch key (the OFF key) being depressed (Yes in step S113) by the user.

Specifically, as the power supply switching off operation (step S115), the projection processing CPU 53 executes a power supply switching off operation of the various ICs which are connected thereto and a power supply switching off operation of such devices as the DMD, which is the display device 51, and the wheel motor 110.

As a power supply switching off operation of the projection system, the projection processing CPU 53 executes a light source turning off operation (step S117) to turn off the light sources by stopping the time sharing control of the light sources which are time sharing illuminated to emit light.

By executing the light source turning off operation in the way described above, the projection processing CPU 53 stops the integration of the light shining time of shining excitation light on to the designated light shining range on the luminescent wheel 101 by the excitation light source 71 and writes the integrated light shining time in the work area of the RAM 55.

Next, the projection processing CPU 53 executes a motor stopping operation (step S119) to stop the driving of the wheel motor 110 by controlling the motor driving circuit to stop the rotation of the luminescent wheel 101.

Then, the projection processing CPU 53 executes a light shining range controlling operation (step S121) to retain in the EEPROM 56 data indicating the respective light shining times of the light shining ranges which are written in the work area of the RAM 55 and the light shining range on the luminescent material layer on to which excitation light is shone twice during one frame next time the projector 10 is activated and ends the series of operations.

Thus, according to the embodiment of the invention, there can be provided the light source system which can suppress the deterioration of the luminescent material by changing the light shining ranges on the luminescent wheel 101 on to which excitation light is shone as required so as to continue to emit clear and stable colored light over a long period of time and the projector which can project a clear image.

In the embodiment, while the luminescent wheel 101 is assumed to rotate four times or rotations within one frame as the rotation speed thereof, the rotation speed of the luminescent wheel 101 is not limited thereto.

For example, in the event that the projector 10 includes the low luminance mode and the high luminance mode as has been described before, the output of the light sources is understood to be changed in accordance with the mode used.

As this occurs, the rotation speed of the luminescent wheel 101 may also be changed, for example, to four rotations per one frame for the low luminance mode and to five rotations per one frame for the high luminance mode.

In this way, even though the projection mode is selected at random by the user to thereby change the rotation speed of the luminescent wheel 101, the respective light shining time to the area A 101b, the area B 101c and the area C 101d are integrated.

Then, in the event that there occurs a case where the integrated light shining time to the area A 101b is the largest and the integrated light shining time to the area C 101d is the least, for example, and moreover, in the event that the integrated light shining time to the area A 101b exceeds the threshold time described above, the laser beam shining timing may be adjusted so that the laser beam is started to be shone on to the area B 101c next time the projector 10 is activated.

In this way, excitation light can be controlled so as to be shone equally on to the plurality of divided light shining ranges on the luminescent wheel 101 by the excitation light source 71 by controlling individually the light shining times to the corresponding light shining ranges. Therefore, the partial deterioration with time of the luminescent wheel 101 can be suppressed to thereby prevent the generation of color spots and a change in color.

In integrating the light shining times to the plurality of divided light shining ranges on the luminescent wheel 101 by the excitation light source 71, the energy radiation amount can be controlled properly by multiplying the light shining time by the light intensity factor in accordance with the intensity of excitation light.

Since the luminescent wheel is rotated at the constant speed, the light shining ranges can be altered freely by adjusting a starting timing of illumination of the excitation light source 71.

In this way, in the embodiment, while the whole light shining range on the luminescent wheel 101 is divided into the three light shining ranges so that excitation light is shone onto them equally, the whole light shining range may be divided into more light shining ranges so that excitation light is shone on to them equally.

The timing at which the light shining ranges are changed can be altered freely by setting the threshold accordingly by controlling the respective light shining times to the light shining ranges on the luminescent wheel 101.

In the embodiment, while the threshold time is set to 500 hours, the threshold time may be set to less than 500 hours so that the light shining ranges can be switched earlier to realize further uniformity.

The invention is not limited to the embodiment that has been described heretofore but can be modified and improved freely without departing from the spirit and scope of the invention.

What is claimed is:

1. A light source system comprising:
   a luminescent wheel in which a luminescent material layer is disposed circumferentially;
   a driving unit for rotating the luminescent wheel;
   a light source for shining excitation light onto the luminescent material layer;
   a light shining control unit for controlling an illumination starting timing of the light source;
   a light shining time integrating unit for integrating individual excitation light shining times to a plurality of predetermined divided areas of the luminescent wheel by the light source;
   an integrated light shining time storage unit for storing the individual light shining times to the predetermined divided areas integrated by the light shining time integrating unit; and
   a light shining range control unit for equalizing times over which excitation light is shone onto the plurality of predetermined divided areas of the luminescent wheel based on the individual excitation light shining times to the predetermined divided areas which are stored in the integrated light shining time storage unit.

2. A light source system as set forth in claim 1, further comprising:
   a rotating position detection unit for detecting a rotation reference position provided on the luminescent wheel,
   wherein when any of the integrated light shining times to the predetermined divided light shining areas which are stored in the integrated time storage unit exceeds a predetermined value, the light shining range control unit equalizes light shining times over which excitation light is shone onto the plurality of predetermined divided light shining areas on the luminescent wheel by causing the light shining control unit to change the illumination starting timing of the light source based on the rotation reference position on the luminescent wheel which is detected by the rotating position detection unit.

3. A light source system as set forth in claim 1, wherein a luminescent material of the same color component is applied to the luminescent wheel along the full circumference thereof.

4. A light source system as set forth in claim 1, wherein the light shining integrating unit performs integration by multiplying light shining time by a light intensity factor in accordance with the intensity of excitation light.

5. A light source system as set forth in claim 1, further comprising:
   a rotating position detection unit for detecting a rotation reference position provided on the luminescent wheel,
   wherein the driving unit drives to rotate the luminescent wheel at a constant speed, and
   wherein the light shining range control unit controls the light shining control unit so as to delay illumination of the light source for a predetermined time length from a point in time when the rotation reference position is detected by the rotating position detection unit.

6. A light source system as set forth in claim 1, wherein in the event that the light shining control unit causes excitation light from the light source to be shone for a time length of 1/j during one frame and the driving unit rotates the luminescent wheel at a speed which is not an integral multiple of j per one frame rate, the light shining range control unit equalizes light shining times over which excitation light is shone onto the plurality of predetermined divided light shining areas on the luminescent wheel based on the integrated light shining times of the predetermined divided areas which are stored in the integrated light shining time storage unit.

7. A projector comprising:
   the light source system set forth in claim 1;
   a display device;
   a light source side optical system and a light guiding optical system for guiding light from the light source system to the display device;
   a projection side optical system for projecting an image emitted from the display device onto a screen; and
   a projector control unit for controlling the light source system and the display device.

8. A projector comprising:
   a red light source for emitting light of a red wavelength band;
   a blue light source for emitting light of a blue wavelength band;
   an excitation light source for emitting excitation light;
   a luminescent wheel on which a luminescent material layer is disposed circumferentially which receives excitation light from the excitation light source to emit light of a green wavelength band;
   a light source side optical system for guiding the light of the red wavelength band, the light of the blue wavelength band and the light of the green wavelength band to the same optical path;
   a driving unit for rotating the luminescent wheel;
   a light shining control unit for causing the light of the red wavelength band, the light of the blue wavelength band and the light of the green wavelength band to be emitted sequentially;
   a light shining time integrating unit for integrating individual excitation light shining times to a plurality of predetermined divided areas of the luminescent wheel by the excitation light source;
   an integrated light shining time storage unit for storing the individual light shining times to the predetermined divided areas integrated by the light shining time integrating unit; and
   a light shining range control unit for equalizing times over which excitation light is shone onto the plurality of predetermined divided areas of the luminescent wheel based on the individual excitation light shining times to the predetermined divided areas which are stored in the integrated light shining time storage unit.

9. A projector as set forth in claim 8, further comprising:
   a rotating position detection unit for detecting a rotation reference position provided on the luminescent wheel,
   wherein when any of the integrated light shining times to the predetermined divided light shining areas which are stored in the integrated time storage unit exceeds a predetermined value, the light shining range control unit equalizes light shining times over which excitation light is shone onto the plurality of predetermined divided light shining areas on the luminescent wheel by causing the light shining control unit to change an illumination starting timing of the excitation light source based on the rotation reference position on the luminescent wheel which is detected by the rotating position detection unit.

* * * * *